United States Patent
Gordon et al.

[15] 3,662,076
[45] May 9, 1972

[54] CARDIAC TRAINING MANNIKIN

[72] Inventors: Michael S. Gordon, Miami, Fla.; Francis B. Messmore, New York, N.Y.

[73] Assignee: Research Corporation, New York, N.Y.

[22] Filed: Apr. 22, 1970

[21] Appl. No.: 30,831

[52] U.S. Cl. ................................................. 35/17
[51] Int. Cl. ........................................... G09b 23/32
[58] Field of Search ..................................... 35/17

[56] References Cited

UNITED STATES PATENTS

| | | | |
|---|---|---|---|
| 3,055,356 | 9/1962 | Chouinard | 35/17 UX |
| 3,154,881 | 11/1964 | Elwell | 35/17 X |
| 3,562,925 | 2/1971 | Baermann et al. | 35/17 |
| 3,564,729 | 2/1971 | Ackerman | 35/17 |

*Primary Examiner*—Harland S. Skogquist
*Attorney*—Jacobi, Lilling & Siegel

[57] ABSTRACT

A training mannikin is disclosed for particular use in simulating various normal and abnormal cardiac conditions in the human body. The mannikin resembles in texture and appearance at least the upper portion of the human body, and has in its interior pulse-producing means including plunger means to simulate pulse points, and sound-producing means to simulate heart beat. Selectively interchangeable cam-operated control means are provided to operate the plunger means in a variety of sequence patterns to simulate a number of normal and abnormal cardiac conditions.

14 Claims, 9 Drawing Figures

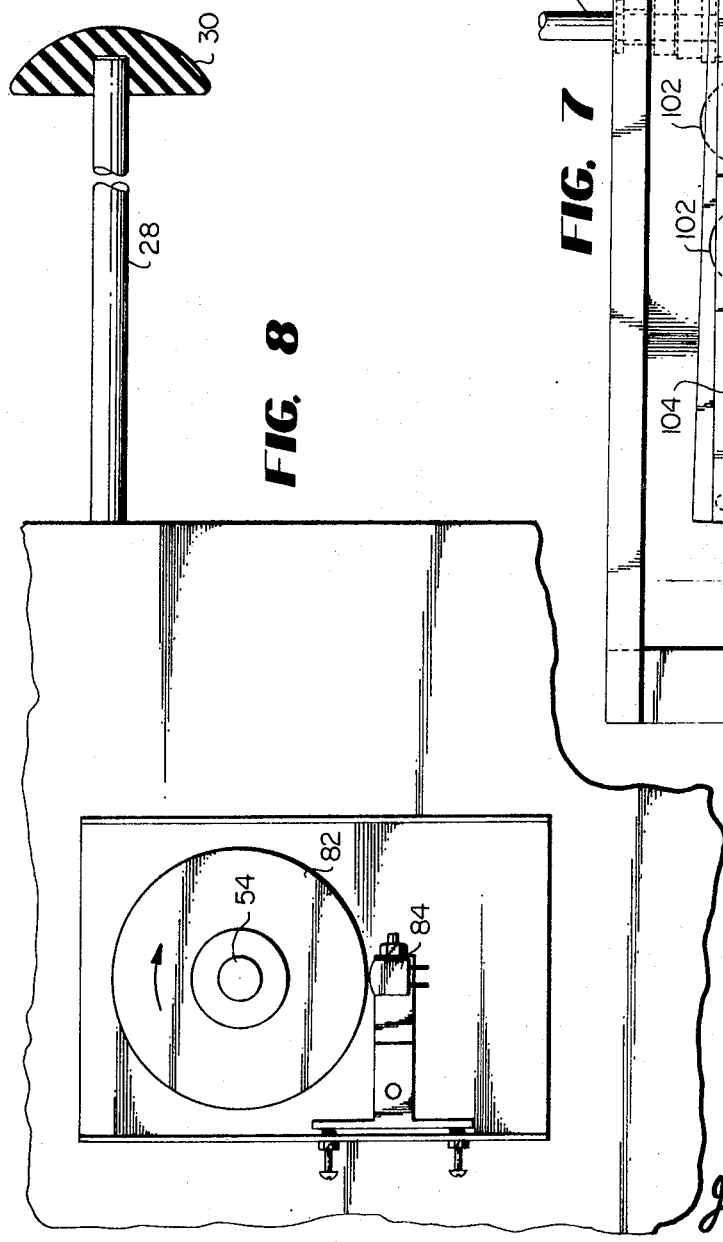
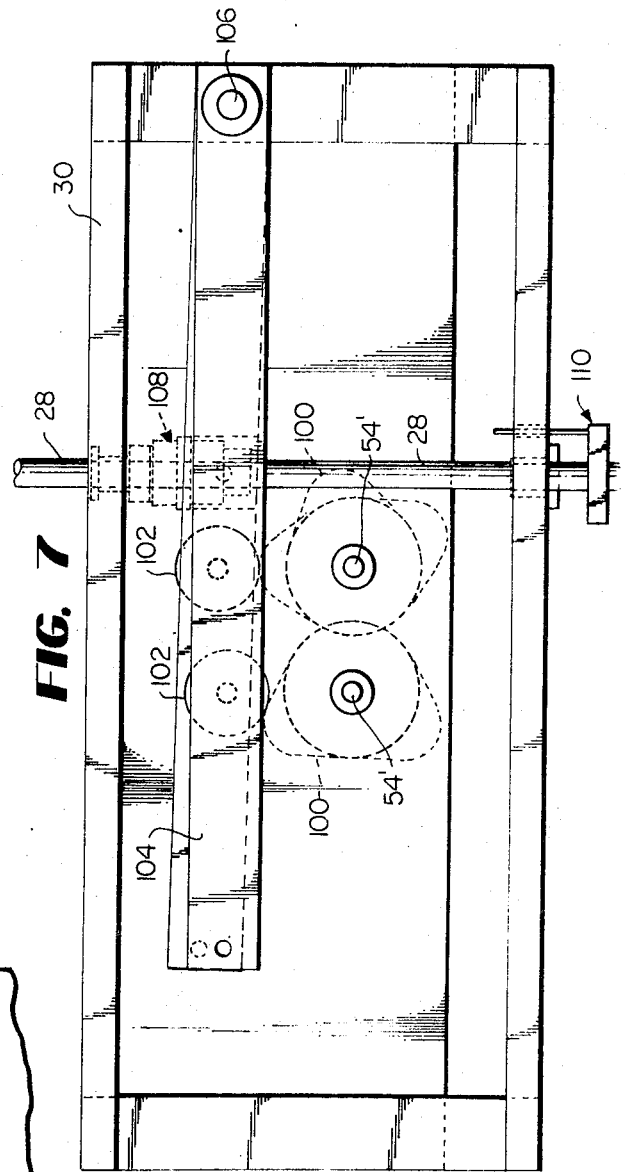

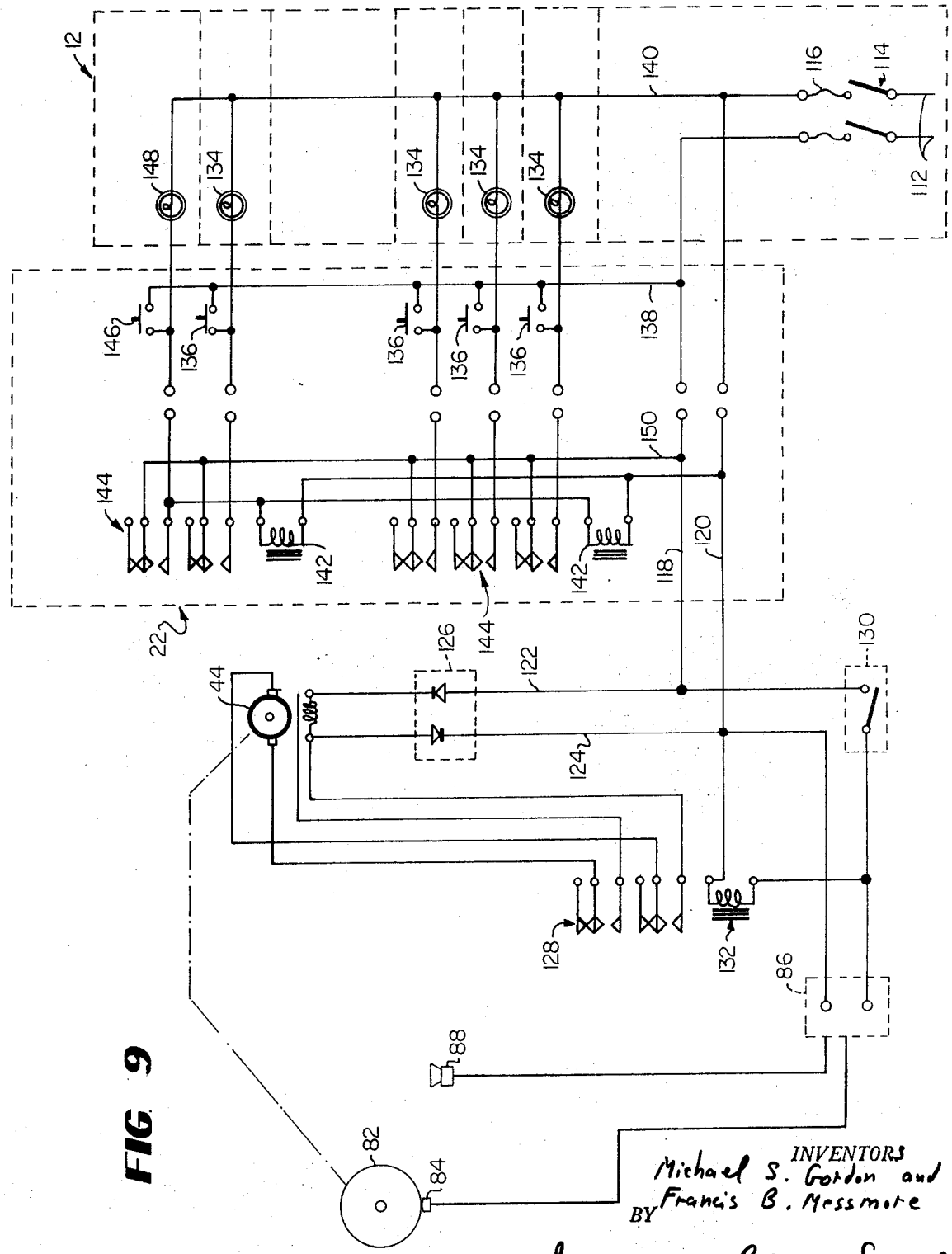

CARDIAC TRAINING MANNIKIN

BACKGROUND OF THE INVENTION

This invention relates generally to the field of medical and surgical training devices, and particularly to a mannikin having means to simulate the various normal and abnormal cardiac conditions.

It has long been an established principle in medical and surgical training, as well as in broader educational aspects, that textbook and lecture material are most effectively absorbed when supplemented with actual experience working on the types of cases studied. In medical practice, this has normally involved having the intern or other trainee accompany the practicing physician on rounds to examine individual patients, so that the trainee may become familiar with the symptoms associated with the various disorders as they appear in a living patient.

The primary drawback of this practice, particularly in regard to cardiac disorders, is that specific disorders can only be studied as patients having such specific disorders are available. It is obvious that this may result in a comparatively haphazard order of study, with the further result that comparatively uncommon disorders, e.g., anuerysms, may not be encountered during the training period. It is further unfortunately true that "interesting patients" may face innumerable and fatiguing examinations by physicians in training.

It has been proposed to at least partially overcome this drawback by providing various types of training aids which attempt to simulate heart sounds and/or heart action associated with various cardiac disorders to provide information relating to such disorders, thus supplementing the normal procedure of training-by-practice. In their simplest form, such training aids may comprise merely sound-reproducing equipment such as phonograph records or tapes or the like; more complex training aids may include fluid systems and pumps to simulate the flow of blood through the body. However, such proposed training aids known in the art generally fail to simulate the overall cardiac action and hence represent only a minor improvement over the use of textbooks and lectures alone.

SUMMARY OF THE INVENTION

With the above background in mind, it is accordingly a primary object of the present invention to provide a medical training device particularly adapted for use in cardiac specialties, which overcomes the above mentioned drawbacks of the prior art.

A further object of this invention is to provide such a training device which includes means to realistically simulate heart beat, pulse, and breathing action for a variety of normal and abnormal cardiac conditions.

Yet a further object of the present invention is to provide such a training device which resembles in texture and appearance at least the upper body portion of a human patient, and which realistically simulates the medical examination of a live patient.

These as well as other objects which will become apparent as the description proceeds, are fulfilled by the present invention which is characterized by a training mannikin for particular use in simulating various normal and abnormal cardiac conditions. The mannikin preferably resembles in texture and appearance at least the upper portion of the human body, and has in its interior pulse-producing means including plunger means to simulate the pulse points, and sound-producing means to simulate the heart beat. Selectively interchangeable cam-operated control means are provided to operate the plunger means in a variety of sequence patterns to simulate a number of normal and abnormal cardiac conditions.

BRIEF DESCRIPTION OF THE DRAWINGS

The invention itself will be better understood, and additional advantages and features thereof will become apparent, from the following detailed description of a preferred embodiment of the invention, taken in conjunction with the accompanying drawings, in which:

FIG. 7 is a side view of an alternate construction of the cam operating means which uses direct mechanical linkage to the plungers;

FIG. 8 is a side view showing details of the sound producing unit; and

FIG. 9 is a schematic diagram of the control circuitry which may be used for controlling the motor drive means and the display board lights.

DETAILED DESCRIPTION OF THE INVENTION

Figure 2:
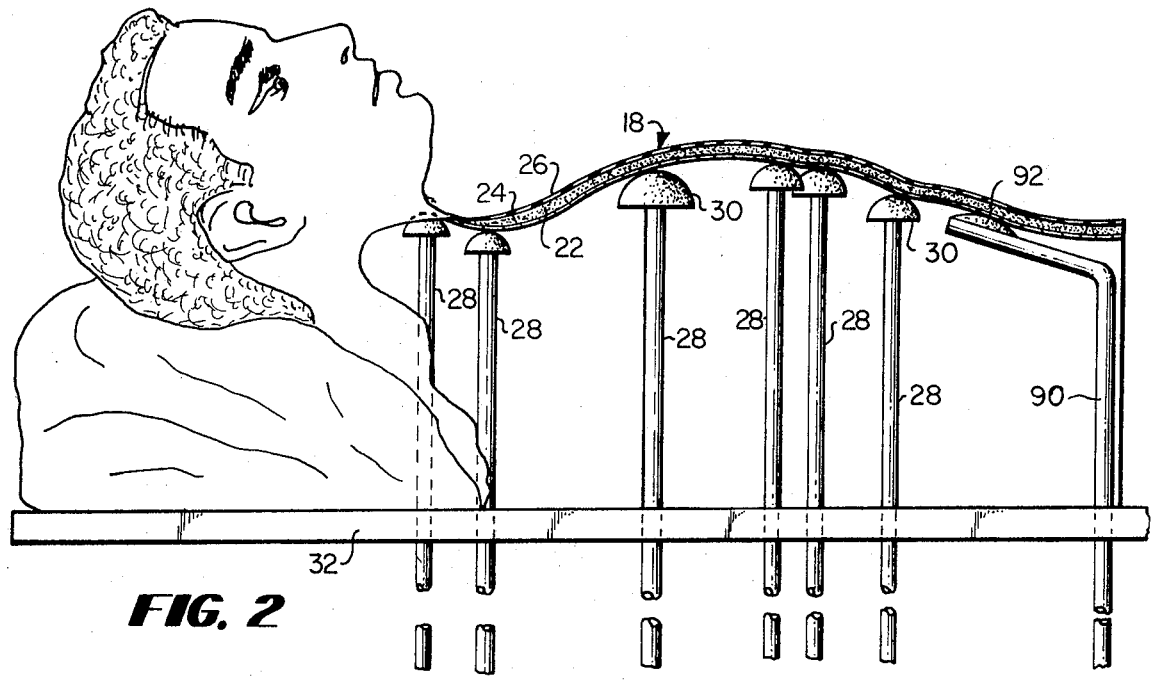
FIG. 2 is a longitudinal section through the mannikin of FIG. 1, showing the locations of the pulse-simulating plungers.
Figure 1:
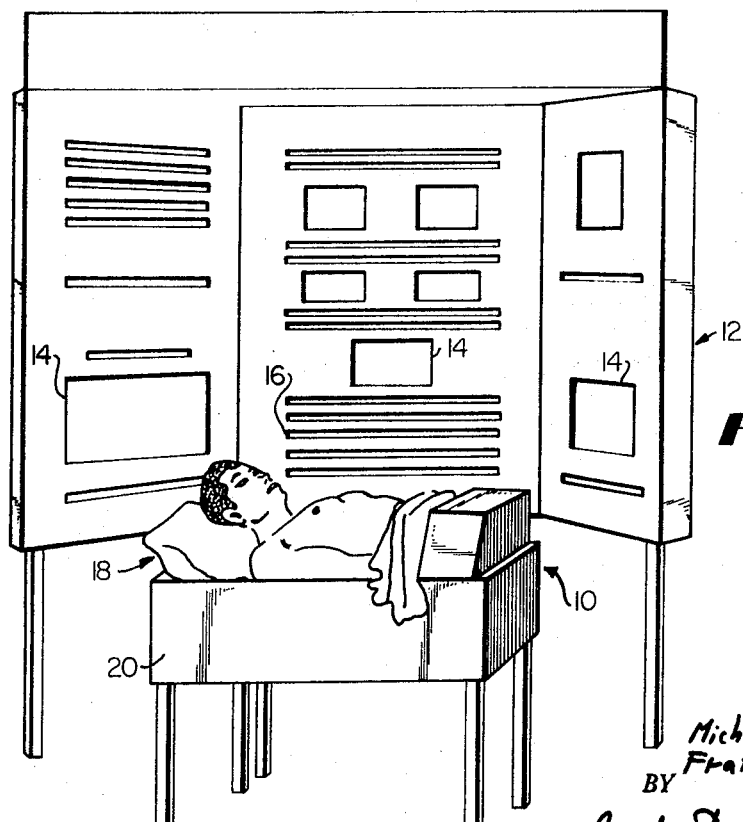
FIG. 1 is a schematic view showing the external appearance of a mannikin and associated display board constructed according to the present invention.

Referring now to the drawings, and particularly to FIGS. 1 and 2, it will be seen that the training mannikin of the present invention preferably comprises a mannikin unit generally designated as 10 and an associated display unit designated as 12. The display unit 12 may preferably comprise a plurality of visual illustrative panels 14 which may, for example, include medical charts, reproductions of X-ray plates and/or cardiograms or the like, and legends and other descriptive material 16 in any well known manner. Inasmuch as such display boards are extremely well known in the visual and educational arts, the display unit 12 will not be further described except as necessary to an understanding of its operative relationship to the mannikin unit 10. Suffice it to say that the illustrative panels 14 and/or the descriptive material 16 may be illuminated by individual lamps which may be activated by the control means to be described at a later point.

The mannikin unit 10, as seen from FIGS. 1 and 2, comprises essentially a mannikin 18 and a housing 20 containing the operating mechanism for the mannikin. The mannikin 18 preferably simulates the external appearance of at least the chest portion of the human body, preferably life-size, and may advantageously have a "skin" constructed of an inner papier-mache base layer 22 which supports and is bonded to a central or intermediate layer of soft sponge rubber or the like 24 and an outer layer of flesh-color latex or the like 26. While other constructions may be utilized, it will be appreciated that the use of the particular materials described above will not only lend to the mannikin a particularly life-like appearance, but also will resemble in its feel and texture the skin of a living human body. Regardless of the particular materials used, however, it is important that the composite "skin" of the mannikin 18 be sufficiently resilient to permit internal pulses, generated by an interior mechanism which will be hereafter described, to be felt on the exterior surface thereof.

Figure 3:
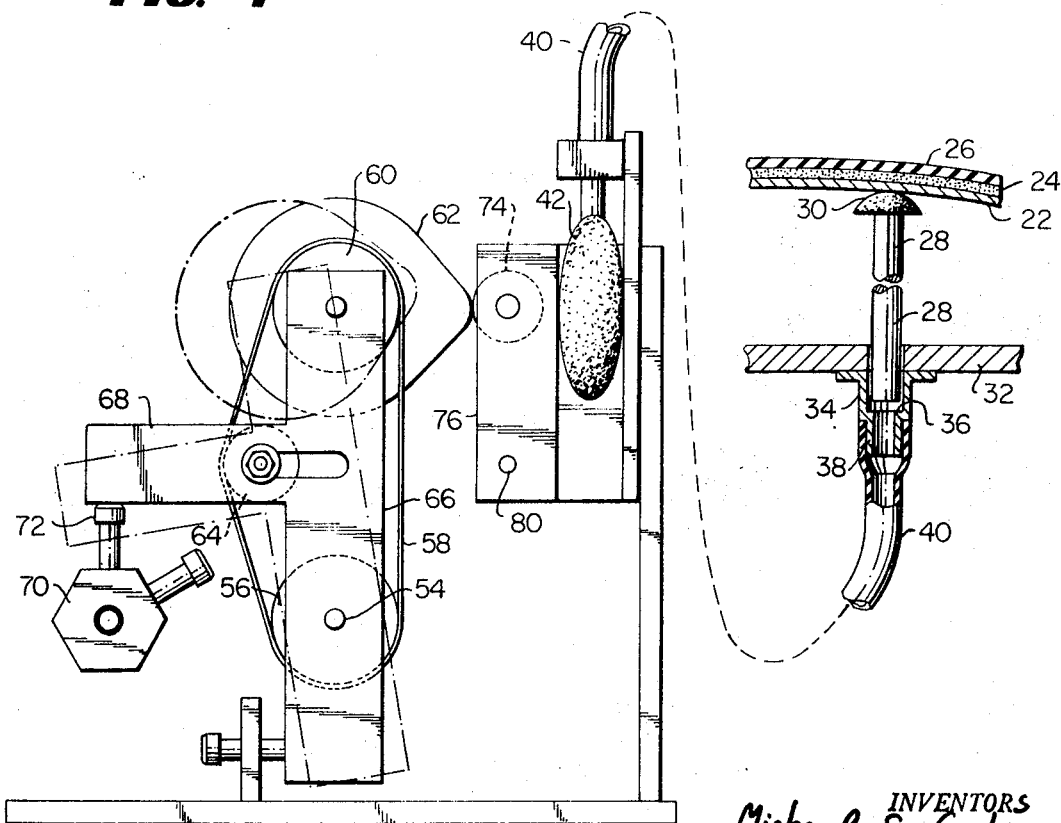
FIG. 3 is a side elevational view of a preferred construction of a cam operating means for the plungers.

The mannikin of this invention, as an important feature thereof, includes means to simulate pulse action at at least one location on the surface thereof, and preferably at a plurality of locations corresponding to commonly used pulse locations. As shown in FIGS. 2 and 3, the pulse generating means preferably comprises one or more substantially vertical push rods 28 at each of the desired pulse locations, each of which push rods terminates at its upper end, adjacent the "skin" of the mannikin, in an enlarged pulse head 30. These push rods 28 extend downwardly through a partition or base plate 32 separating the mannikin 18 proper from its mechanism housing 30, and are contacted adjacent their respective lower ends by a suitable operating means which raises and lowers each push rod 28 and its associated pulse head 30 in a particular sequence to simulate the pulse. While any suitable locations of the pulse heads may be utilized, it has been found particularly expedient to utilize pulse heads corresponding in location to the locations of the left and right ventricles, the aorta, the pulmonary artery, the ectopic area, the jugular vein, and the carotids.

Each of the push rods 28 is mounted by suitable guide means for limited vertical reciprocation, and is provided with means to effect such vertical reciprocation in a particular sequence. In FIG. 3 there is illustrated a preferred embodiment of the means for effecting such vertical reciprocation. Inasmuch as the operating mechanisms for each of the push rods 28 are substantially identical, only a single such operating mechanism is shown, it being understood that the operating mechanisms for the remainder of the respective push rods are substantially identical to that shown and illustrated. From FIG. 3, it will be seen that the push rod 28 terminates at its lower end beneath the base plate 32, within a substantially cylindrical collar member 34, which collar member has an internal diameter slightly larger than the external diameter of push rod 28, so that the push rod is free for vertical sliding movement therein but does not permit substantial fluid leakage between the collar and the push rod. The collar member 34 includes an internal shoulder 36 upon which the lower end of the push rod rests when in its lowermost or inactivated position, and further includes a downwardly extending hollow cylindrical portion 38 which may advantageously be of a reduced diameter relative to the main body portion of collar member 34. It will be appreciated that collar member 34 thus, in effect, forms a fluid cylinder open at its upper end, in which push rod 28 acts as a piston member which is movable upwardly responsive to fluid pressure in the cylinder. A fluid pressure conducting means is secured to the downwardly extending portion 38 of the collar member, and may preferably comprise a suitable length of flexible rubber hose or tubing 40 which is press fitted at its one end about the cylindrical portion 38 in substantially airtight relation. The opposite end of the tubing 40 communicates in substantially airtight relationship with a resilient squeeze bulb or the like 42. It will be appreciated, therefore, that when the squeeze bulb 42 is compressed, air within the tubing 40 is pressurized and therefore causes the push rod 28 to slide upwardly and thus press pulse head 30 upwardly against the "skin" of the mannikin, creating a pulse-like movement. There may, if desired, be provided means to limit the upward movement of push rod 28; however, advantageously the volume of the squeeze bulb 42 as well as the diameter of push rod 28 and collar 34 are selected so that only a slight upward movement of the push rod 28 will result from a complete compression of the squeeze bulb 42.

Figure 4:
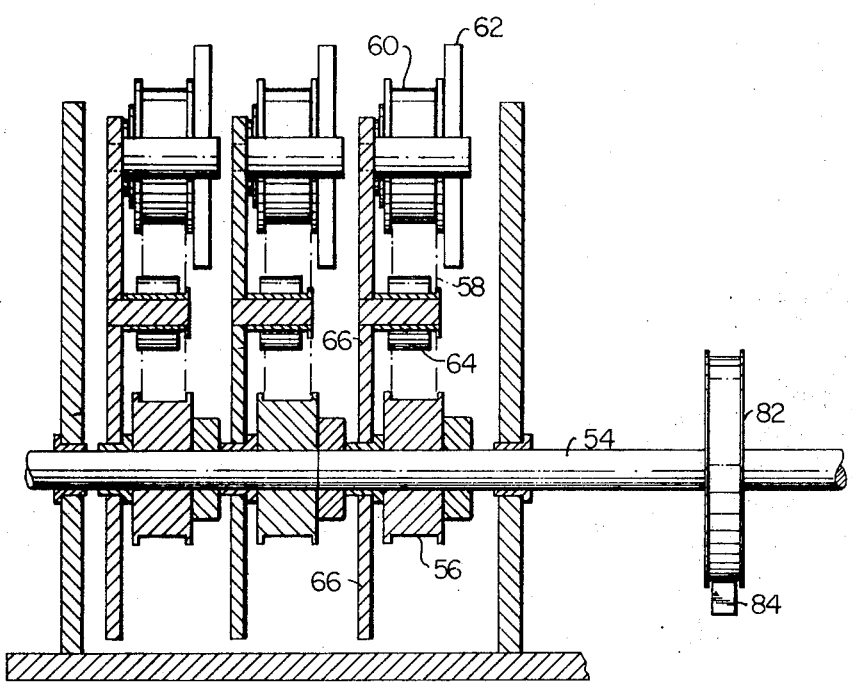
FIG. 4 is a front view of the cam operating means of FIG. 3.

Cam drive means are provided for compressing the squeeze bulb 42, which drive means are shown in FIGS. 3 through 6, inclusive. As perhaps best seen in FIG. 6, a suitable drive motor 44, through a transmission 46 and suitable takeoff means including takeoff shaft 48 and belt driven pulleys 50 and 52, rotates one or more drive shafts 54. A typical cam assembly for a single pulse generating unit is illustrated in FIGS. 3 and 4, wherein for sake of illustration three cams are shown activating a single squeeze bulb 42. For each individual cam, a pulley 56 is rigidly secured to drive shaft 54 to rotate therewith, and a drive belt 58 passes about the drive pulley 56, a driven cam pulley 60, and an idler pulley 64, all of which are mounted upon a cam bracket 66 which is free for limited pivotal movement about the axis of drive shaft 54, as shown in solid and phantom lines in FIG. 3. A lobed cam 62 is rigidly secured to the driven cam pulley 60 for rotation therewith, whereby it will be seen that rotation of the drive shaft 54, through each of the belts 58, drives each of the cams 62 at each cam operating location. Each of the cam brackets 66 is biased, by gravity or any other suitable biasing means, counterclockwise as seen in FIG. 3 towards its phantom line position, and is maintained in its clockwise, solid line position by means of a stop member 72 secured to a rotatable control member 70, which stop member 72 contacts a rigid extension 68 of the cam bracket 66. The purpose of this control member 70 and stop member 72 will be further described hereunder.

A cam follower means is provided for each pulse generating unit, which comprises a cam follower member such as roller 74, extending axially relative to the cams and of sufficient length to contact all of said cams within a single pulse generating unit when the cams are in operative position. The follower roller 74 is mounted for free rotational movement upon a follower bracket 76, which bracket is mounted for limited pivotal movement about a shaft 80 at the lower end thereof. The follower bracket 76 includes a transverse compressor bar member 78 (best seen in FIG. 5), which is positioned so as to compress squeeze bulb 42 when the bracket 76 is pivoted clockwise about its shaft 80 through the action of one or more of the cams 62. Thus, it will be seen that, assuming at least one cam of a given unit is in its operative position, rotation of the drive shaft will rotate the cams 62, the lobes of one or more cams contacting the follower roller 74 and pivoting the bracket 76 clockwise about its shaft 80, as seen in FIG. 3, so as to compress the bulb 42 and thus raise its associated push rod 28 to generate a single pulse.

The control member 70 has a plurality of stop members 72 secured thereto in each axial position corresponding to the axial location of extension 68 of bracket 66 of each of the respective cams 62. These stop members 72 are arranged in such a pattern that rotating control member 70 to a selected rotational position will permit any desired combination of the brackets 66 in a single unit, and hence their respective cams 62, to be retained in their clockwise, operative position shown in solid lines in FIG. 3, while the remainder of the brackets 66 within this same unit will be allowed to pivot counterclockwise under the influence of gravity or other biasing means to the phantom-line, inoperative position in FIG. 3. Thus, it will be seen that any desired combination of cams within a single unit may be selected to contribute to generating the pulse of a single pulse generating unit, thereby providing a plurality of different complex pulse patterns at a given pulse point depending upon the rotational position of control member 70 selected.

Means are also provided for producing an audible heart sound in synchronism with the generation of the pulses. In its simplest form, the sound producing means may comprise an endless magnetic tape unit 82 secured to drive shaft 54 for rotation therewith, and a tape pickup head or the like 84 mounted in proximity to the tape reel 82, in known manner, to produce electrical audio signals which may be amplified through a conventional tape amplifier 86 and fed to one or more small speakers 88 within the body, as shown schematically in FIG. 9. It is clear, however, that any other suitable means may be utilized for producing such heart sounds, the only primary requirement of same being that the means used should include a direct mechanical drive from the drive means for the cams so that the heart sounds may be synchronized with the pulses generated.

Figure 6:
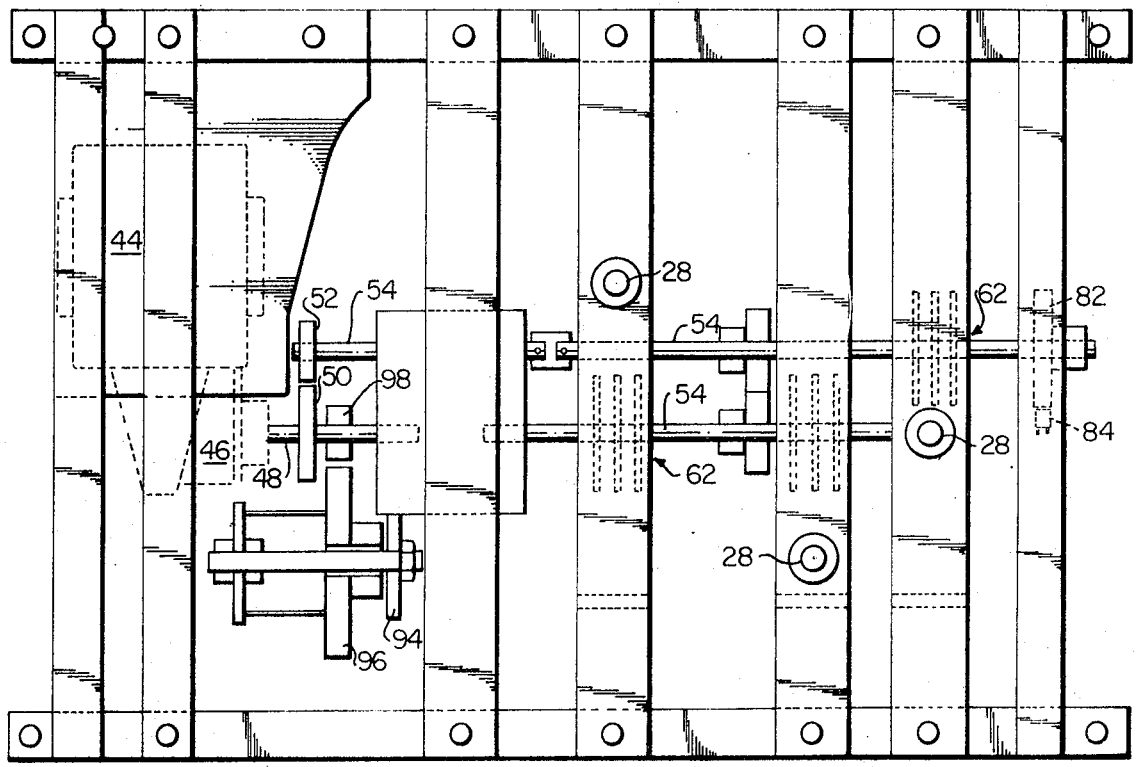
FIG. 6 is a bottom view of the cam operating means of FIG. 3.
Figure 5:
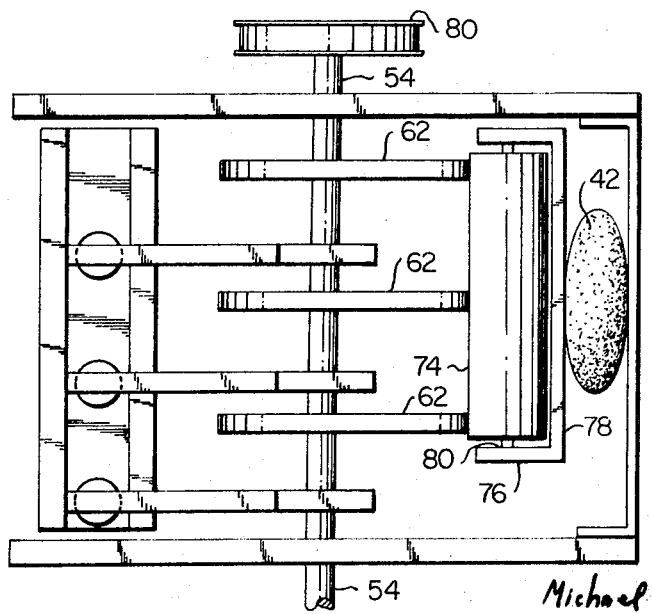
FIG. 5 is a top view of the cam operating means of FIG. 3.

Additionally, means may be provided for producing simulated breathing movements of the lower chest and diaphragm. For this purpose, as shown in FIG. 2 and 6, a breathing push rod 90 may be provided in the vicinity of the lower chest or diaphragm of the mannikin, and having a breathing head 92 secured thereto. The push rod 90 may be activated by the same type of cam and squeeze bulb mechanism as utilized for the pulse generation, in which case a breathing cam 94 may be provided secured to a driven breathing pulley 96; this breathing pulley may be belt driven by a driving pulley 98 secured to take-off shaft 48, as seen in FIG. 6, or by any other suitable means. It is clear that, for the breathing operation, only a single cam 94 need be provided for ordinary breathing action. However, should it be desired to simulate more complex breathing action, as for example, "catching" of the breath, a plurality of cams may be utilized to operate the breathing mechanism in the same manner as each of the pulse generating units.

In FIG. 7 there is illustrated an alternative embodiment of the pulse generating means in which a direct mechanical connection is provided between the pulse generating cams and the push rod 28. Again, in this figure, only the operating mechanism for a single push rod is illustrated, it being understood that the operating mechanisms for the remainder of the push rods are substantially identical to that shown. As shown, a pair of lobed pulse generating cams 100 are shown respectively secured to a pair of rotating drive shafts 54', which drive shafts are substantially identical with the drive shafts 54 previously illustrated. These cams may have one or more lobes and are in continuous contact with respective rotatable cam follower rollers 102, which cam follower rollers are each respectively rotatably mounted upon a single elongated follower bar 104, the follower bar being pivotally mounted at one end thereof upon a shaft or bearing 106. Suitable securing means 108 are provided for generally pivotally securing the push rod 28 to the follower bar member 104, so that pivoting movement of the bar 104 will result in vertical sliding motion of the push rod 28, as seen in FIG. 7, to assist in straight line vertical movement of the push rod 28. Suitable bearing and guide means 110 may be provided for this push rod where it passes through a portion of the frame of the operating mechanism. While it is clear that the follower bar 104 could, if desired, contact the cams 100 directly, it will be appreciated that the use of the follower rollers 102 rotatably mounted within the follower bar 104 will considerably reduce friction between the cams 100 and the cam follower members. As in the case of the air pressure actuated mechanism, it will be appreciated that any number of cams 100 may be utilized for each pulse generating unit depending upon the complexity of the pulse which it is desired to generate.

In FIG. 9 there is shown schematically a typical power and control circuit which may be utilized for the mannikin and display unit of the present invention. Referring first to the power and control circuits for the mannikin itself, it will be seen that leads 112 are provided connected to a suitable source of power, such as conventional ac current, and are connected through a master on-off switch 114, fuses 116, and conductors 118, 122 and 120, 124, respectively, to a dc rectifier 126, relay 128, and motor 44. Branching from conductors 118 and 120, as seen on the left side of this figure, the tape amplifier 86 and solenoid 132 for the points 128 are controlled through a floor pad pressure switch 130, although it is clear that any other suitable on-off switch may be provided in place thereof. Thus, assuming that master switch 114 is closed, it will be seen that closing floor pad switch 130 will activate the tape amplifier 86 and energize solenoid 132, thereby closing the points of relay 128 and activating the motor 44.

On the right side of the circuit illustrated in FIG. 9 there is shown the preferred circuitry of control box 22 and display unit 12. The display unit 12 is provided with a plurality of lamps 134 which may individually illuminate the respective portions of the illustrative panels 14 and/or the descriptive material 16 upon the display unit. These lamps may be individually energized through their respective push buttons 136 and conductors 138 and 140, to thereby manually illuminate each individual lamp 134. To light all lamps 134 simultaneously, a plurality of relay points 144 are wired in parallel with each of the push buttons 136 to their respective lamps 134, through conductor 150, and are simultaneously actuated by one or more solenoids 142 also wired in parallel to the push buttons 136 and to the relay points 144. The solenoids 142 are activated through a master or "summary" push button 146, whereby closing push button switch 146 will activate the solenoid or solenoids 142, closing all points 144 and lighting all lamps 134 simultaneously through conductors 150 and 140. Additionally, master or "summary" push button switch 146 illuminates its own individual lamp 148 which may be advantageously arranged as a summary light summarizing the information illuminated by each of the other lamps 134.

It is believed that operation of the device will be apparent from the description of its construction above; however, the operation will be briefly reviewed. Assuming that master on-off switch 114 is closed, and that the selector or control members 70 for each of the pulse locations have been pre-set to generate a predetermined pulse pattern at each pulse point, the floor pad or other switch 130 is then closed and motor 44 and tape amplifier 86 will be activated. The motor rotates drive shaft 54, which in turn rotates all of the cams 62; those cams 62 at each pulse location which are pivoted into their active position by the respective stop members 72 on each control member 70 will, upon each rotation, pivot cam follower bracket 76 and compress squeeze bulb 42, thereby raising the respective push rods 28 and creating a pulse of the desired pattern at each pulse point. At the same time, the breathing push rod 90 will be activated in a similar manner, to produce a breathing movement at the area of the lower chest or diaphragm, and the sound producing means will be activated to produce an audible heart beat. Alternatively, in the embodiment illustrated in FIG. 7, rotation of the drive shafts 54 will rotate the cams 100, thereby pivoting the follower bar 104 and similarly raising the push rod 28 to generate a pulse. As an auxiliary function, the individual push buttons 136 may be depressed to illuminate their respective lamps 134, which may for example illuminate information regarding typical symptoms or the like related to a specific disorder, and finally master push button 146 may be pushed to activate the display relays and illuminate all lamps 134 and the summary lamp 148 simultaneously.

It is contemplated that numerous modifications may be made to the specific structure described above without departing from the spirit of the invention. Specifically, for example, the display unit 12 may include, in addition to the static display panels 14 and 16 shown, one or more oscilloscopes or other waveform-readout means on which reproductions of heartbeat and/or any other suitable life-signs may be dynamically displayed from a suitable signal source such as a magnetic tape or the like. Suitable means may be provided, if desired, for sunchronising such dynamic waveform display with the operation of the pulse-generating units and other mechanical operations of the mechanism.

It is believed evident that by providing a mannikin according to the description above, all of the objects set forth at the outset of the specification have been successfully fulfilled, and particularly, a training mannikin has been provided which in a simple manner simulates pulse, heart beat, and breathing action, as well as providing sequentially illuminated display information.

What is claimed is:

1. A training device of the type used in simulating cardiac conditions comprising:
   a. at least one manikin unit;
   b. a plurality of push rods within said manikin; and
   c. cam-operated means within said manikin for operating said push rods in a pre-determined time pattern thereby producing a pulse-like action on the surface of said manikin.

2. A training device as defined in claim 1, wherein said manikin unit comprises a resilient skin, at least one end of said push rods being located adjacent the interior surface of said skin, means for mounting said push rods for limited vertical reciprocation, and cam means for effecting vertical reciprocation of said push rods.

3. A training device as defined in claim 2, wherein said means for effecting vertical reciprocation of said push rods comprises fluid pressure activated means.

4. A training device as defined in claim 3, wherein said fluid pressure activated means includes cylinder means associated with the other end of said push rods, said push rods defining piston means within said cylinder, said cam means is rotatable, fluid compression means activated by said cam means, and fluid pressure conducting means communicating said compression means with said cylinder means, whereby rotation of said cam means compresses fluid within said conductor means and effects vertical movement of said push rods within said cylinder.

5. A training device as defined in claim 4, wherein said fluid compression means comprises a resilient squeeze bulb compressed by said cam means.

6. A training device as defined in claim 4, wherein said cam means comprises a plurality of cams associated with each of said fluid compression means, each of said cam means being selectively movable from an inoperative position wherein it rotates without activating said compression means, and an operative position wherein it activates said compression means.

7. A training device as defined in claim 6, further comprising control means for selectively positioning a combination of said plurality of said cam means into their said operative position.

8. A training device as defined in claim 7, further comprising means for producing audible heart sounds in synchronization with the production of said pulse actions.

9. A training device as defined in claim 8, further comprising means for effecting simulated breathing movement of said skin of said mannikin.

10. A training device as defined in claim 2, wherein said means for effecting vertical reciprocation of said push rods includes at least one cam follower member pivotally secured to said push rods, and said cam means is rotatable and operatively associated with said cam follower member, whereby rotation of said cam means pivots said cam follower means and effects vertical reciprocation of said push rods.

11. A training device as claimed in claim 10, wherein said cam means comprises a plurality of cams each operatively associated with said cam follower means.

12. A training device as defined in claim 11, further comprising means for producing audible heart sounds in synchronism with said pulse-like action.

13. A training device as defined in claim 12, further comprising means for producing a simulated breathing action of said skin of said mannikin unit.

14. A training device as defined in claim 1, wherein said mannikin simulates in texture and appearance at least the chest portion of a human body.

* * * * *